Patented Sept. 9, 1930

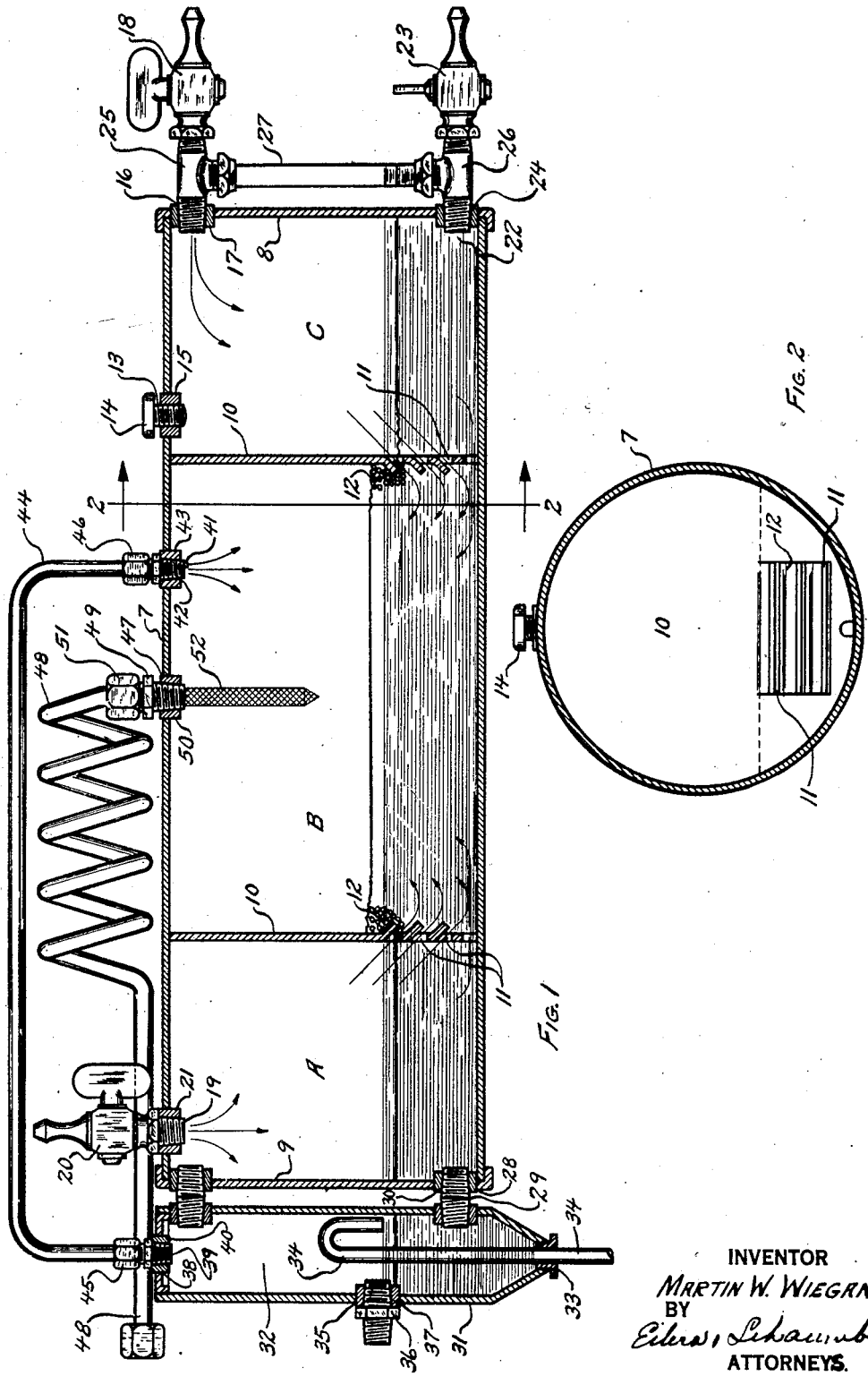

1,775,263

UNITED STATES PATENT OFFICE

MARTIN W. WIEGAND, OF ANGLUM, MISSOURI

AUXILIARY VAPOR-SUPPLYING APPLIANCE FOR GAS ENGINES

Application filed September 29, 1927. Serial No. 222,813.

My object is to provide a means whereby water vapor or oil vapor or both may be automatically introduced into the cylinder or explosive chamber of a gas engine, and further, to provide an apparatus for that purpose that is simple and of inexpensive construction. A further object is to provide an appliance of this character which may be readily attached to any ordinary gas engine without altering the engine. In order to accomplish these results I use the hereinafter described apparatus which preferably utilizes water vapor from the radiator, and, after forcing it through water and oil, and mixing it with air, injects it through the usual intake manifold into the cylinders of the gas engine.

My invention consists in the novel construction and arrangement of parts hereinafter described and particularly pointed out in the claim. While I show and describe my invention applied to an automobile gas engine, I do not limit myself thereto as it is equally applicable to any gas engine.

In describing the various arrangements employed and shown in the drawings hereto attached, I do not limit my invention to the precise form of construction in which the apparatus, or the several parts thereof, is shown or described, inasmuch as various alterations may be made therein without changing the scope of my invention.

In the drawings, Fig. 1 is a longitudinal sectional view of a device constructed in accordance with this invention. Fig. 2 is a cross-section of said device, along the line 2—2 of Fig. 1 and shows a partition in position.

Referring to the drawings, 7 is a tank, which is preferably mounted upon a part of the engine, to which it is secured by straps, or any other suitable means. This tank is made of a suitable material, preferably copper or brass, and in the manufacture thereof I prefer to use a cylinder or tube and close the same at the ends 8 and 9. This tank, as is shown in Fig. 1, is preferably divided into three compartments, designated as A, B, and C, by means of partitions 10, which are soldered or otherwise joined with the wall of the tank in such manner as to make the joints air-tight. These partitions are substantially of the shape and design shown in Fig. 2 and are preferably formed of any suitable material from a single stamping. Slotted openings 11 are made in the lower portion of each partition to permit communication between the adjacent compartments. For efficiency in the operation of the apparatus I prefer to make these openings in the form of louvers, and position the partitions so that the openings will be adjacent the bottom of the tank, and below the fluid level maintained therein, as is shown in the drawings. The formation of the louvered openings 11, has the result of forming baffles 12, disposed substantially horizontally, and directed oppositely, in each case downwardly and toward the chamber B. Experiments have shown that a substantial increase in the moisture content of the gases passing through the apparatus, results from the use of the louvered openings in the partitions. 13 is a filler opening in the upper part of the tank through which water, oil or other desired matter may be introduced into the tank. This opening may communicate directly with either one of the chambers of the tank, but for convenience, I prefer to make it as shown in the drawing so that it will communicate directly with the compartment C. This opening is normally kept closed by a threaded plug 14. As the tank is preferably constructed of a light material, a bushing 15 may be positioned in this opening into which the plug 14 may be screwed.

An opening 16 is made in the upper portion of the end 8 of the tank, and a pet-cock 18 is positioned therein, either directly or in conjunction with a bushing 17, as shown in the drawings. Another opening 19 is made in the upper portion near the end 9 of the tank and a similar pet-cock 20 is possitioned in this opening, either directly or in a bushing 21. These openings are air-inlets to the tank, the amount of air which passes therethrough being controlled by means of the pet-cocks 18 and 20.

An opening 22 is made in the lower portion of the tank, through which the contents of the tank may be drained off when desired. A pet-cock or a drain plug 23 may control this opening, preferably by means of a bushing 24, and is normally kept closed, it being opened only when desirable or necessary to drain the tank. For convenience, I prefer to make this opening in the end 8 of the tank and adjacent the bottom, as shown in the drawings, rather than in the bottom itself. The petcocks 18 and 23, as shown, are connected with openings 16 and 22 through T connections 25 and 26. Between these connections is inserted a gage glass 27, to enable the user to ascertain, at a glance, the level of fluid in the tank 7. This feature is important, since the operation of the apparatus is dependent upon the presence of a suitable volume of liquid in the tank. An opening 28 is made in the lower portion of the tank and preferably in the end in which a connection 29 is positioned, either directly or else in conjunction with a bushing 30, which is fitted into the opening. This connection 29 communicates with an overflow trap 31, whereby the contents of the tank may be maintained at a fixed level, which is preferably about one-third of the height of the tank, and which is shown in the drawings by the indicated fluid line.

The overflow trap 31 is connected to the tank 7 by means of a connection 29, as described, with which it is joined in any suitable manner. This overflow trap consists of an air-tight chamber 32. In constructing the trap, I prefer to use brass or other metallic tubing and close the same at the ends in any manner that will prevent air passing therethrough. In the drawings I have shown the chamber tapered toward the bottom and closed at the lower end by a bushing 33 for the removal of sediment, but this is merely a detail of construction which may be varied without altering the result which is obtained. The chamber 32 communicates with the tank by means of the connection 29, through which the contents of the tank enters the chamber. A stand-pipe 34, preferably a goose neck tube, is positioned in the chamber 32 so that the upper end thereof, which is open, will be approximately one-third the height of the tank and the lower end will extend through the bottom of the overflow trap. In operation, liquids will pass through the connection 29, from the chamber 32. As the liquid rises in the tank there will be a corresponding rise of the liquid in the chamber 32, until it reaches the open end of the pipe 34, into which any surplus will flow and by which it will be conducted away, thus maintaining the desired level in the tank. For convenience, the pipe 34 may be extended a sufficient length to conduct any surplus liquid below the crank-case of the engine, where it may be discharged upon the roadway.

An opening 35 is made in the wall of the chamber 32 and preferably above the inlet of the pipe 34, in which a connection 36 is positioned, either directly or in conjunction with a bushing 37. A pipe, not shown, may be attached to this connection, this pipe being connected at its other end with the overflow pipe of the radiator. This pipe is used to conduct water vapor from the radiator into the tank and I prefer to block off the usual overflow pipe of the radiator so that all waste or excess water will pass through my device before being discharged.

38 is an opening in the top of the chamber 32 in which a connection 39 is positioned, preferably in conjunction with a bushing 40. An opening 41 is made in the tank and preferably in the top of the compartment designated as B, and a connection 42 is positioned in this opening. I likewise prefer to use a bushing 43, which is positioned in this opening and into which the connection 42 is screwed. One end of a pipe 44 is attached to the connection 39 by means of a coupling 45 and the other end of said pipe is joined to the connection 42 by means of a coupling 46. Water vapor, which is conducted from the radiator into the apparatus by means of the pipe connection 36, passes through the opening 38 and into the pipe 44, by which it is conducted into the tank through the opening 41. Any water which may come through the pipe connection 36, remains in the overflow trap, the excess being discharged, as heretofore described, the trap also retaining any dirt or foreign matter which is thus prevented from entering the tank. 47 is an opening in the tank 7, preferably in the top of the chamber designated as B, through which a mist or vapor passes, this vapor being conducted into the engine by a pipe 48. A connection 49 is positioned in this opening, either directly or in combination with a bushing 50. One end of the pipe 48 is joined to this connection by means of a coupling 51, and the other end is connected with the intake manifold of the engine. This pipe is preferably coiled as shown in the drawing so that any water carried by the vapor or mist which passes therethrough will be prevented from entering the engine. 52 is a screen which is joined to the inner end of the connection 49 and which tends to prevent any of the contents of the tank passing through the pipe 48 except in a vapor form. A cut-off (not shown) may be inserted in the pipe 48 anywhere between the tank and the engine so that the use of the apparatus may be cut off when desired.

In using my device the tank 7 is partially filled with water, the amount being regulated by the trap, as heretofore described. Upon operating the engine a partial vacuum occurs in the intake manifold, this vacuum being communicated to compartment B of the tank through the pipe 48. This vacuum causes air to enter the tank through the pet-cocks 18 and 20, as is indicated by the arrows, the air being drawn into the compartment B through the openings 11 in the partitions and taking up moisture in passing therethrough. The air is deflected downward and through the water by baffles 12, as described. The water vapor from the radiator, which enters the tank through the connection 36, passes into the compartment B in the same manner and tends to raise the temperature of the moistened air or mist which is to be introduced into the combustion chamber of the engine. This vapor or mist is drawn through the opening 47 in the tank and is conducted to the intake manifold by the pipe 48.

I have found that the efficiency of my apparatus is increased by adding a slight amount of crude oil or cylinder oil to the water. This oil floats on the surface and creates an air seal which tends to prevent air being drawn from the tank into the intake manifold when the engine is starting. Furthermore, air which is drawn into the tank is drawn through this oily water and is mixed with the vapor arising therefrom, which furnishes a supplemental explosive mixture and serves to enrich the mixture of air and hydro-carbon vapor passing into the engine.

I claim as my invention:

In a water vapor supplying device for gas engines, a tank comprising a plurality of aligned, communicating water compartments, a water gauge connected to one of said compartments, partitions separating the compartments, a plurality of louvered openings in each of said partitions, baffles formed in said partitions in connection with said openings, the baffles being adapted to direct currents of air and water downwardly into the central one of said compartments, a fluid connection between the upper portion of said central compartment and adapted to connect with the intake of a gas engine, an overflow trap connected to said tank, means in said trap for maintaining a fixed water level in the trap and tank, said means comprising a goose-neck conduit adapted to serve as a siphon to remove excess water from the tank and the overflow trap down to a predetermined level, and a conduit connecting the radiator of the engine with said overflow trap.

MARTIN W. WIEGAND.